(12) United States Patent
Lazones et al.

(10) Patent No.: US 11,584,467 B2
(45) Date of Patent: Feb. 21, 2023

(54) KICKSTAND

(71) Applicant: Koninklijke Gazelle N.V., Dieren (NL)

(72) Inventors: Lex Lazones, Dieren (NL); Emond Lammers, Dieren (NL); Sierd Heida, Dieren (NL)

(73) Assignee: KONINKLIJKE GAZELLE N.V., Dieren (NL)

( * ) Notice: Subject to any disclaimer, the term of this patent is extended or adjusted under 35 U.S.C. 154(b) by 99 days.

(21) Appl. No.: 17/180,313

(22) Filed: Feb. 19, 2021

(65) Prior Publication Data

US 2021/0261212 A1    Aug. 26, 2021

(30) Foreign Application Priority Data

Feb. 21, 2020    (NL) .................................. NL2024963

(51) Int. Cl.
*B62H 1/02*    (2006.01)
(52) U.S. Cl.
CPC ....................................... *B62H 1/02* (2013.01)
(58) Field of Classification Search
CPC ....................................................... B62H 1/02
See application file for complete search history.

(56) References Cited

U.S. PATENT DOCUMENTS

| | | | | | |
|---|---|---|---|---|---|
| 4,443,024 A | * | 4/1984 | Okai | ........................ | B62H 1/06 |
| | | | | | 280/304 |
| 6,199,888 B1 | * | 3/2001 | Ito | ............................ | B62H 1/04 |
| | | | | | 280/303 |
| 6,918,607 B2 | * | 7/2005 | Nakazawa | ............... | B62H 1/02 |
| | | | | | 280/301 |
| 7,303,204 B2 | * | 12/2007 | Takahashi | ................ | B62H 1/02 |
| | | | | | 280/301 |
| 8,998,237 B2 | * | 4/2015 | Zhu | .......................... | B62H 1/04 |
| | | | | | 180/219 |
| 10,029,753 B2 | * | 7/2018 | Ramraika | ................ | B62H 1/02 |
| 10,494,044 B2 | * | 12/2019 | Privitelli | .................. | B62H 1/04 |
| 11,186,335 B1 | * | 11/2021 | Uimonen | ................ | B62J 25/00 |
| 2006/0061061 A1 | * | 3/2006 | Chuang | .................... | B62H 1/06 |
| | | | | | 280/293 |

(Continued)

FOREIGN PATENT DOCUMENTS

| CN | 200988519 Y | 12/2007 |
|---|---|---|
| CN | 201872809 U | 6/2011 |

(Continued)

OTHER PUBLICATIONS

Foreign Search Report and Written Opinion for corresponding Netherlands application No. NL2024963; dated Oct. 7, 2020 (11 pages).

*Primary Examiner* — Jacob B Meyer
*Assistant Examiner* — Hosam Shabara
(74) *Attorney, Agent, or Firm* — Mendelsohn Dunleavy, P.C.

(57) ABSTRACT

A kickstand (17) and bike comprising such a kickstand. The kickstand comprises
a base (18) connected or connectable to a bike frame (2);
a stand (19) movable relative to the base between a standing position and a retracted position; and
a latch (20) latching the stand in the standing position. The latch is pivotable about a horizontal rotational latch axis ($R_L$) between a latching position and a release position.

20 Claims, 5 Drawing Sheets

(56) References Cited

U.S. PATENT DOCUMENTS

| | | | | |
|---|---|---|---|---|
| 2007/0235979 A1* | 10/2007 | Lin | .......................... | B62H 1/04 |
| | | | | 280/298 |
| 2008/0174088 A1* | 7/2008 | Kobacker | ................ | B62H 3/04 |
| | | | | 280/293 |
| 2020/0409381 A1* | 12/2020 | Corbett | .................. | B62K 21/00 |
| 2021/0024164 A1* | 1/2021 | Mauck | ................... | B62K 19/46 |

FOREIGN PATENT DOCUMENTS

| | | |
|---|---|---|
| CN | 201914354 U | 8/2011 |
| CN | 207697876 U | 8/2018 |
| JP | 2923829 B2 | 7/1999 |
| JP | 4781155 B2 | 9/2011 |

\* cited by examiner

KICKSTAND

FIELD OF THE INVENTION

The present disclosure relates to a kickstand for a bike and to a bike comprising such a kickstand. A kickstand of a bike can be moved between a retracted position and a standing position supporting the parked bike to stand upright without additional support. Kickstands are usually biased to a retracted position by means of a spring. Hitherto, such springs are usually positioned in such a way that the kickstand can be stabilized in a standing position by pulling it past a dead point.

BACKGROUND OF THE INVENTION

While most bikes are usually provided with a side stand kickstand, cargo bikes typically comprise a center stand kickstand, providing a more stable and robust parking position. Such a center stand kickstand typically comprises a pair of legs or a U-shaped bracket lifting the front or rear wheel off the ground when in use. An example of such a center stand kickstand is disclosed in CN 200988519. JP 2923829 discloses a kickstand for a motorbike comprising a latching mechanism operable by means of a Bowden-cable.

It is an object of the invention to provide a kickstand, which is easy to use, providing a more robust and safe parking position, in particular for cargo bikes.

BRIEF SUMMARY OF THE INVENTION

The object of the invention is achieved with a kickstand comprising:
- a base;
- a stand movable relative to the base between a standing position and a retracted position;
- a latch latching the stand in the standing position, the latch being pivotable about a substantially horizontal rotational latch axis between a latching position and a release position. By using a latch, there is no need to pull the kickstand past a dead point, so actuation of the kickstand requires less force. The kickstand is safely latched and locked in the standing position. The horizontal orientation of the rotational latch axis makes it possible to economically use available installation space and jointly move the latch and the stand in a single movement.

The kickstand does not need to be pulled past a dead point. Defining the vertical position as a "6 o'clock position" the stand can be configured to arrive at its final standing position at a position before the 6 o'clock position, e.g., any position between the 4 o'clock position and the 6 o'clock position, e.g., about the 5 o'clock position. In these positions, the stand extends downward with a rearward inclination in side view.

The base can be connected directly or indirectly to the bike frame, e.g., to a lower side of the frame or a cargo box.

In a specific embodiment, the latch comprises a pedal. A pedal operated latching mechanism facilitates easy foot control is easy to use and can be safely locked into the standing position, so it provides a stable and safe way of parking a bike. Alternatively, the kickstand can be operated by other means, such as a Bowden cable or a hand operated handle.

The latch can be biased into the latching position, e.g., by using a latch biasing spring element. This helps to avoid unintentional release of the latch. A user can push down the pedal against the action of the latch biasing spring in order to release the latch.

Similarly, the stand can be biased into the retracted position, e.g., by using a stand biasing spring element. Releasing the latch will automatically allow the biasing spring to flip the stand into the retracted position, without the need for further action by the user.

In a specific embodiment, the kickstand may comprise an inertia damper to prevent abrupt movement of the stand when the stand is pulled back by the stand biasing spring into the retracted position. The inertia damper can for example be a rotary damper, e.g., using oil damping. One end of the rotary damper can be connected to the stand while the other end is connected to the base.

In a specific embodiment, the stand is movable about a rotational stand axis. The rotational stand axis may for example be substantially parallel to the rotational latch axis. The rotational latch axis may for example be at a front side of the rotational stand axis. Optionally, the pedal of the latch extends below the rotational stand axis between the latch and a position at a rear side of the rotational stand axis. This results in a compact arrangement. Since the pedal runs below the rotational latch axis, pushing down the pedal when the stand is in the standing position results in a release of the latch.

Optionally, the stand may be provided with a guiding flange having an outline gradually pushing down the latch during movement of the stand from the retracted position to the standing position. The guiding flange may for example comprise a terminal edge, e.g., a substantially radial edge, arranged to let the latch snap behind it and to form a stop engaging the latch in the latching position. This way, the latch does not need to be actuated separately. In a single movement, the stand is pushed down and latched. The guiding flange may for example have a curved outline with a radius, which, starting from the radial edge, gradually increases.

The stand can for example be symmetrically U-shaped with two legs extending from a middle section, with the two legs pointing rearward when the stand is in the retracted position, and downward when the stand is in the standing position. The legs are typically substantially parallel in side view and/or diverging in front view. The legs may be provided with caps at their outer ends.

The U-shaped stand may for example comprise a cam fixed to the middle section forming the guiding flange.

A symmetrical design of the kickstand allows a more advantageous distribution of forces during normal use. For instance, the cam may comprise two symmetrically shaped and arranged guiding flanges fixed to the middle section of the U-shaped stand, while the latch comprises two symmetrically shaped and arranged latch flanges engaging the guiding flanges of the cam.

The rotational latch axis may for example run through the guiding flanges of the cam, e.g., at a distance rearward from a central plane through the legs and the middle section of the U-shape. With such an embodiment, the biasing spring is optionally connected to the frame at a point rearward from the rotational latch axis. Such an arrangement helps to optimize the bias spring adjustment.

To simplify foot control of the stand, one or both of the legs of the U-shaped stand may comprise a support extending rearward from a lower end of the leg, the legs and the support defining a support face.

The kickstand of the present invention is particularly suitable for a cargo bike, or a motor bike, but can also be used for any other type of bike, such as e-bikes, step scooters, motor scooters, trikes or conventional bikes.

The disclosure also relates to a kickstand comprising
a base connected or connectable to a cycle frame (2);
a stand movable—e.g., pivotable—relative to the base between a standing position and a retracted position;
a latch latching the stand in the standing position, the latch comprising a pedal, allowing unlatching by foot control. The stand can be provided with one or more guiding flanges moving the latch from a retracted position to the latching position when the stand is moved to the standing position, e.g., as set out above, irrespective of the orientation of a rotational latch axis.

The above-described aspects will hereafter be more explained with further details and benefits with reference to the drawings showing a number of embodiments by way of example.

DETAILED DESCRIPTION OF INVENTION

Figure 1:
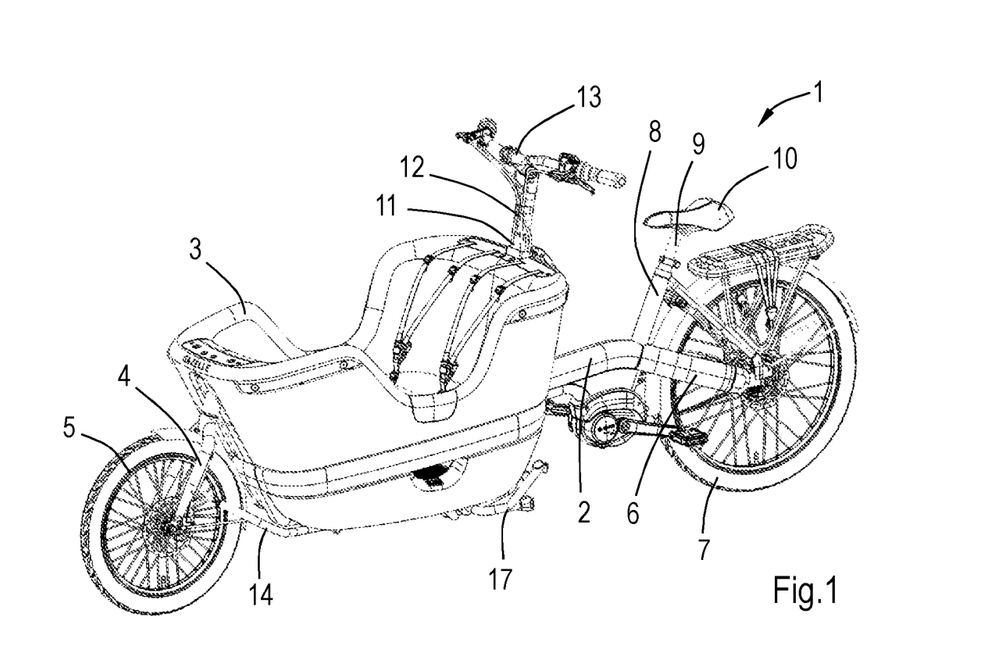
FIG. 1: shows an exemplary embodiment of a cargo bike in perspective view.

FIG. 1 shows a cargo bike 1 with a frame 2 supporting a cargo box 3. The cargo bike 1 comprises a front fork 4 connected to a front end of the frame 2 and holding a front wheel 5. The rear side of the frame 2 comprises a rear fork 6 holding a rear wheel 7. The frame 2 also comprises a seat tube 8 holding a seat post 9 supporting a saddle 10. A head set 11 of the frame 2 receives a steerer tube 12 with a top end carrying a bicycle steer 13. Below the cargo box 3 is a kickstand 17, shown in more detail in FIG. 2.

Figure 2:
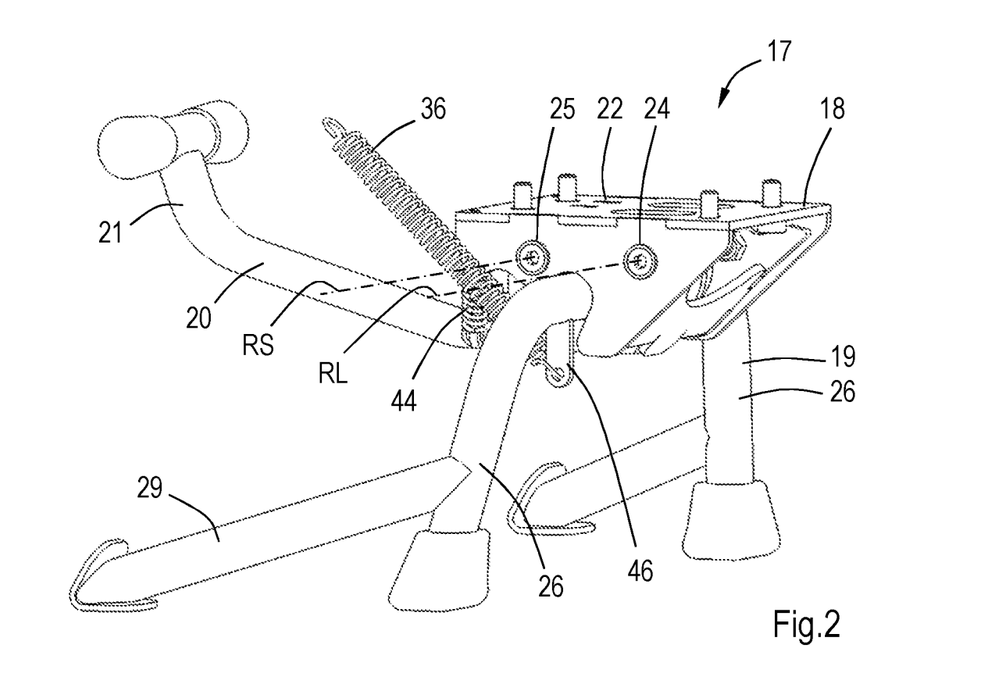
FIG. 2: shows the kickstand of the cargo bike of FIG. 1 in a standing position.
Figure 3:
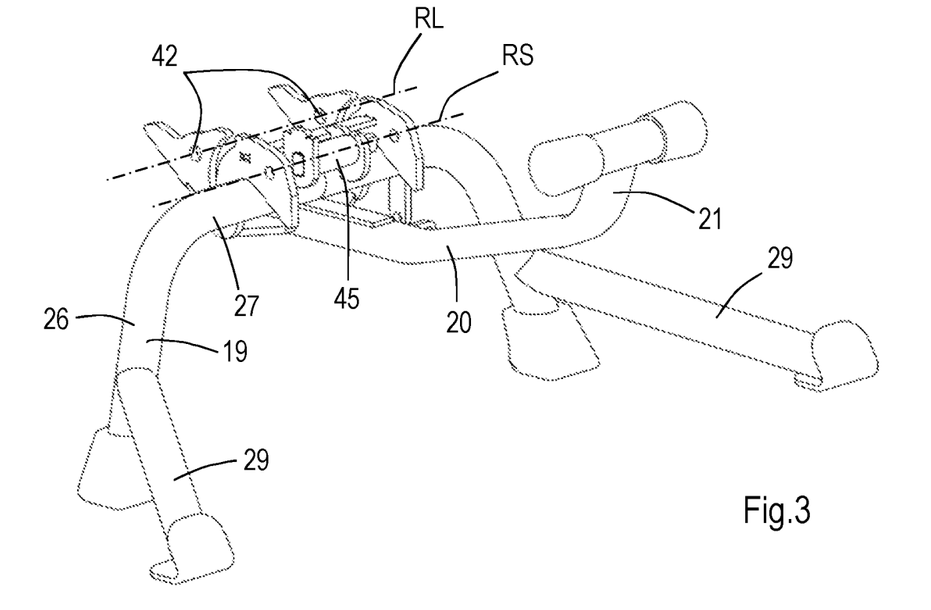
FIG. 3: shows the kickstand of FIG. 2 in perspective view in a standing position without the base.
Figure 7:
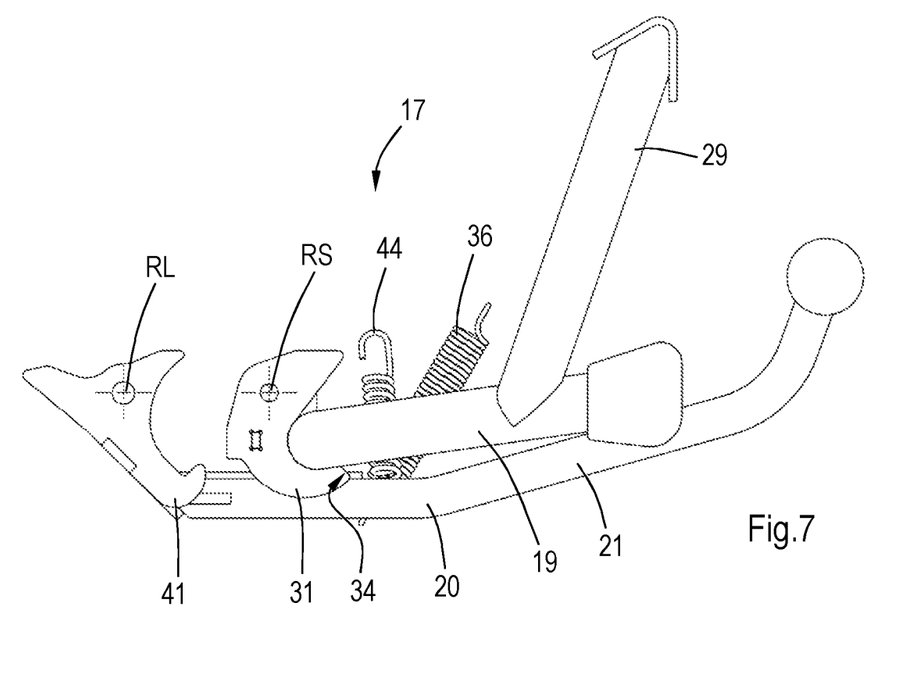
FIG. 7: shows the kickstand of FIG. 2 in side view in the retracted position.
Figure 8:
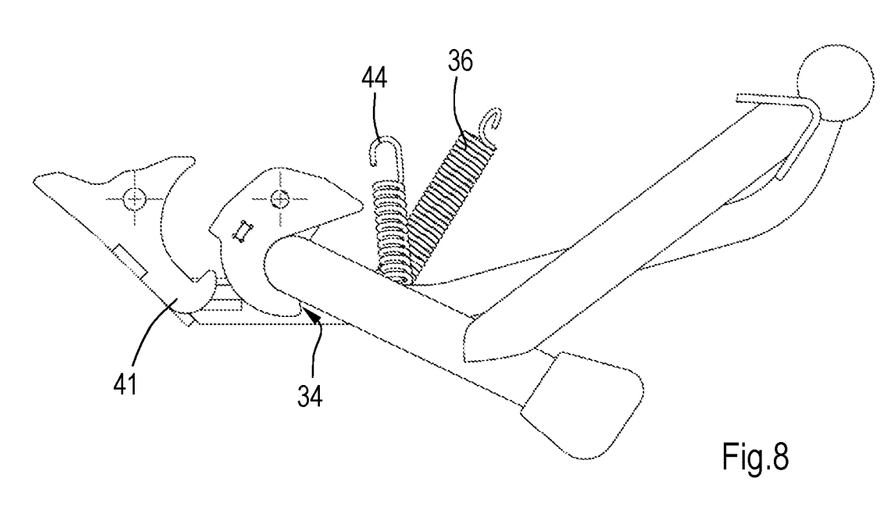
FIG. 8: shows the kickstand of FIG. 2 in side view in a first intermediate position.

The kickstand 17 comprises a base 18 fixed to a bottom surface of the frame 2, and a stand 19 which is movable relative to the base 18 between a standing position (see FIGS. 2 and 10) and a retracted position (FIG. 7). The kickstand 17 further comprises a latch 20 with a latch pedal 21. The latch 20 locks the stand 19 in the standing position. FIG. 3 shows the kickstand 17 without the base 18.

Figure 4:
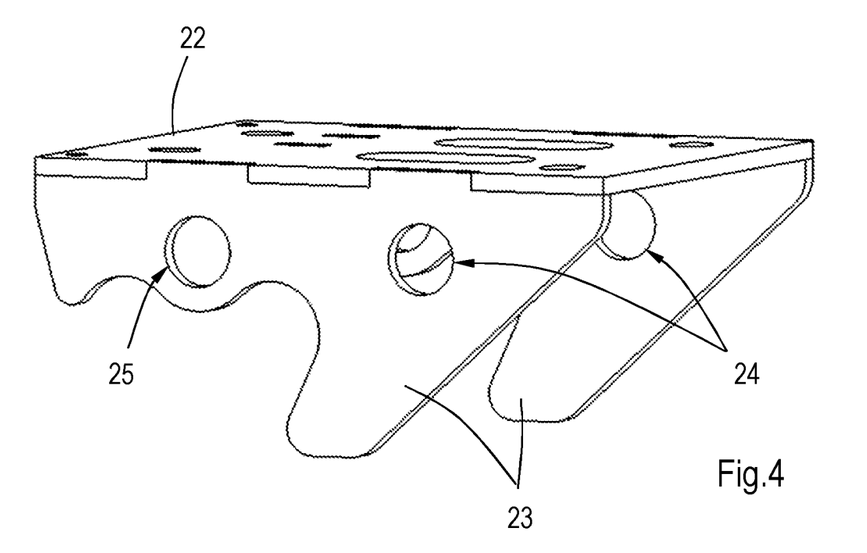
FIG. 4: shows the base of the kickstand of FIG. 2 in perspective view.

The base 18 is shown separately in FIG. 4. The base 18 of the kickstand 17 comprises a base plate 22 fixed to the frame 2, and two parallel base flanges 23 extending downward. The base flanges 23 comprise two pairs of aligned openings 24, 25 for receiving respective axles. A first pair of aligned openings 24 is near a front side of the base 18. A second pair of aligned openings 25 is near a rear side of the base 18.

Figure 5:
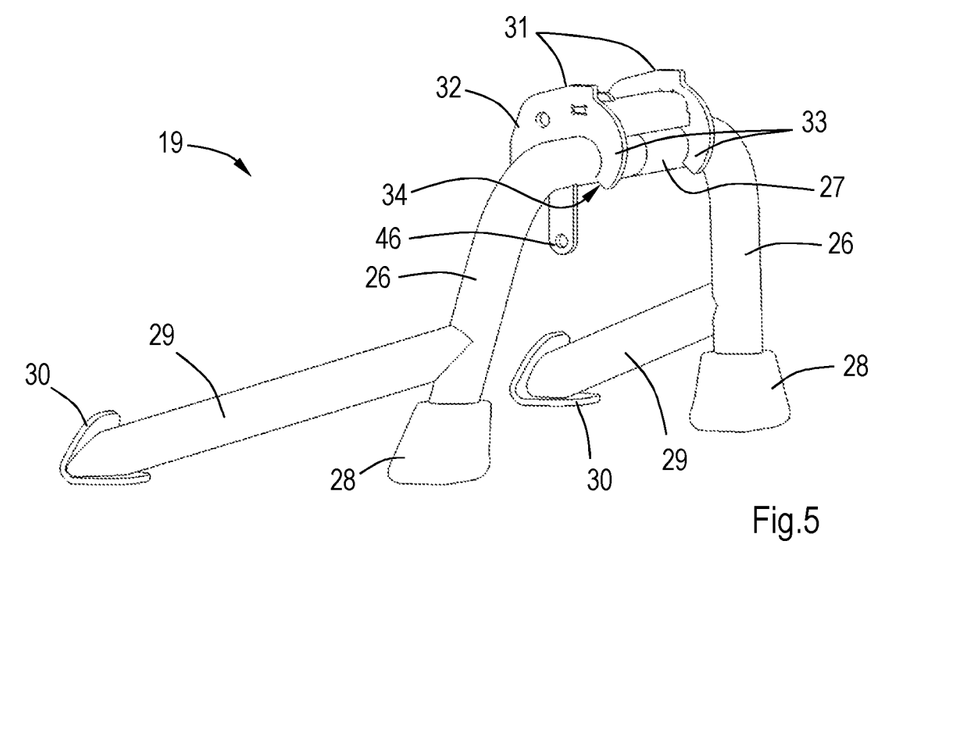
FIG. 5: shows the stand of the kickstand of FIG. 2 in perspective view.
Figure 10:
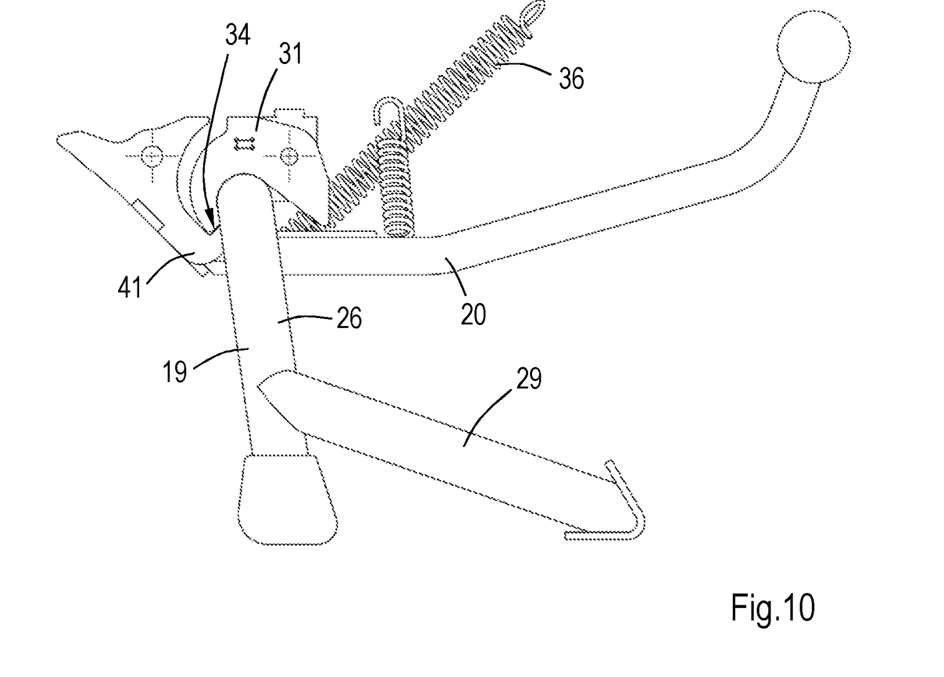
FIG. 10: shows the kickstand of FIG. 2 in side view in the standing position.

The stand 19 is shown separately in FIG. 5. The stand 19 is symmetrically U-shaped with two diverging legs 26 extending from a middle section 27. The legs 26 point rearward when the stand 19 is in the retracted position (FIG. 7), and downward when the stand 19 is in the standing position (FIGS. 2 and 10). The U-shape construction can for example be tubular. The ends of the legs 26 are capped by caps 28. Both legs 26 have a support arm 29 extending rearward and downward from a point just above the respective cap 28. The outer ends of the support arms 29 and the outer ends of the legs 26 define a support face for the parked cargo bike 1. The support surface is approximately horizontal in the standing position. The ends of the support arms 29 are capped by triangular caps 30 having a flat bottom surface aligned with the support surface.

The middle section 27 of the U-shaped stand 19 comprises two symmetrically shaped and arranged guiding flanges 31 forming a cam of a latching mechanism of the kickstand 17. The guiding flanges 31 are substantially perpendicular to a longitudinal axis of the middle section 27. The guiding flanges 31 have an axle bearing end 32 at a rear side of the middle section 27 and a downwardly curved narrowing tail 33 warping around a front side of the middle section 27 of the U-shape. This narrowing tail 33 is truncated by a substantially radial edge 34. Starting from the radial edge 34, the outline of the tail end 33 has a gradually increasing radius. Alternatively, other geometries with a gradually increasing radius can also be used.

The axle bearing end 32 has an opening receiving a shaft section or axle stub 35 rotatably received in one of the aligned openings 25 near the rear side of the base 18. Since the two guiding flanges 31 are symmetrical and aligned, just like the aligned openings 25 in the two base flanges 23, the axle stubs 35 can rotate jointly along the same rotational stand axis $R_S$. This way, the stand 19 can rotate between the retracted position and the standing position.

A stand biasing spring 36 (FIG. 2) is connected to a projection 46 extending downward from the middle section 27 of the U-shaped stand 19 and to the frame 2, such that the stand biasing spring 36 biases the stand 19 to its retracted position. In this position, the support arms 29 of the stand 19 point upward and are accessible by a user's foot. If a user pushes her or his foot onto one of the support arms 29 of the stand 19, the stand 19 will rotate about the rotational stand axis $R_S$ against the action of the stand biasing spring 36, which will be stretched elastically.

Figure 6:
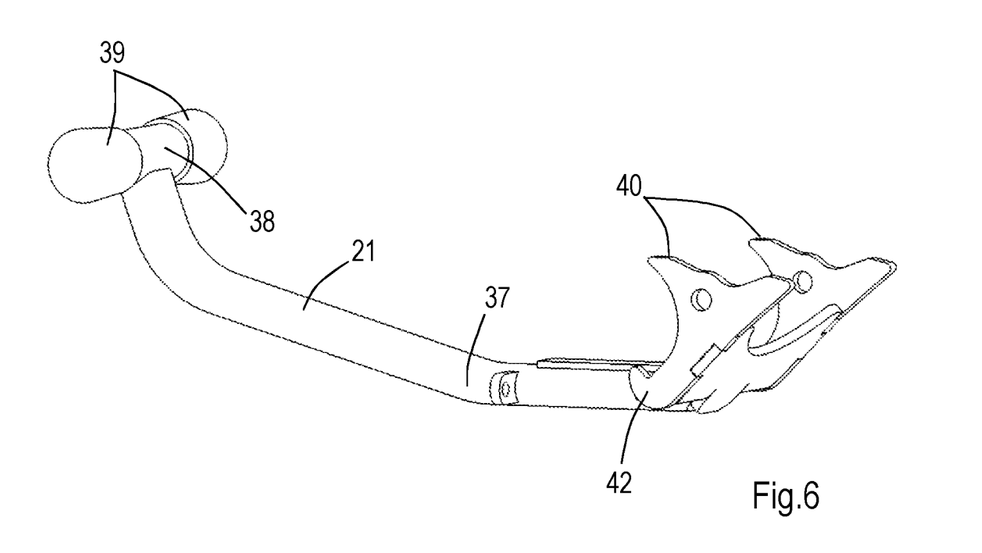
FIG. 6: shows the latch of the kickstand of FIG. 2 in perspective view.

The latch pedal 21, shown separately in FIG. 6, has a tubular body 37 with one end topped by a short traverse tube 38 with sealing caps 39, and an opposite end between two symmetrically shaped and arranged latch flanges 40. The tubular body 37 of the latch pedal 21 is slightly curved such that the end with the traverse tube 38 points upward to facilitate easy foot control.

The two latch flanges 40 fixed to the other end of the latch pedal 21 have respective lower ends 41 fixed to the terminal end of the tubular body 37, and top ends provided with openings 42 aligned with the openings 24 near the front end of the base 18. Since the two latch flanges 40 are symmetrical and aligned, just like the aligned openings 24 in the two base flanges 23, axle stubs 43 can be received in the openings 24, 42 and rotate jointly along the rotational latch axis $R_L$. This way, the latch 20 can rotate between the latching position and a release position by pushing down the latch pedal 21.

The lower ends 41 of the latch flanges 40 form hooks configured to engage the radial edges 34 of the respective guiding flanges 31 of the stand 19. Both latch flanges 40 are substantially in the same plane with the respective guiding flanges 31, allowing the radial edges 34 of the guiding flanges 31 to abut the hook-shaped lower end 41 of the respective latch flange 40 when the latch 20 is in a latching position and the stand 19 is in the standing position.

The rotational axis $R_L$ of the latch 20 is at a distance in front of the rotational axis $R_S$ of the stand 19. The tubular body 37 of the latch pedal 21 extends from the lower end 41 of the latch flanges 40 to a rear side of the stand 19. The tubular body 37 extends below the middle section 27 of the U shaped stand 19.

A latch biasing spring 44 (FIGS. 7-10) is connected to the latch pedal 21 and to the base 18, such that the latch biasing spring 44 biases the latch 20 to its latching position. If a user pushes her or his foot onto one of the support arms 29 of the stand 19, the stand 19 will rotate about the rotational stand axis $R_S$ against the action of the stand biasing spring 44, which will be stretched elastically.

FIG. 7 shows the kickstand 17 in the retracted position, allowing the cargo bike 1 to be driven. In this position of the kickstand 17, both the latch pedal 21 and the stand 19 point rearward towards the seat tube 8. The rotational axis $R_L$ of the latch pedal 21 is more distant from the seat tube 8 than the rotational axis $R_S$ of the stand 19. The legs 26 of the stand 19 point rearward and the support arms 29 point upward, such that the top ends 30 of the support arms 29 are in reach of a user standing next to the cargo bike 1 and holding the steer 13.

To move the kickstand 17 into the standing position, the user can push down one of the support arms 29 of the stand 19, e.g., by foot. The guiding flanges 31 of the stand 19 have an outline shaped to gradually push down the latch 20 during movement of the stand 19 from the retracted position to the standing position (FIGS. 8 and 9) until the hook-shaped lower ends 41 of the latch 20 snap behind the radial edges 34 of the guiding flanges 31 into the latching position under the action of the latch biasing spring 44 (FIG. 10). In this position, the latch 20 blocks the stand 19 against the action of the stand biasing spring 36, and prevents that the stand biasing spring 36 pulls back the stand 19 into the retracted position. In the standing position, the legs 26 of the stand 19 point downward and one of the wheels 5, 7 of the cargo bike 1 is lifted. The cargo bike 1 is supported by the legs 26 and the support arms 29 of the stand.

Figure 9:
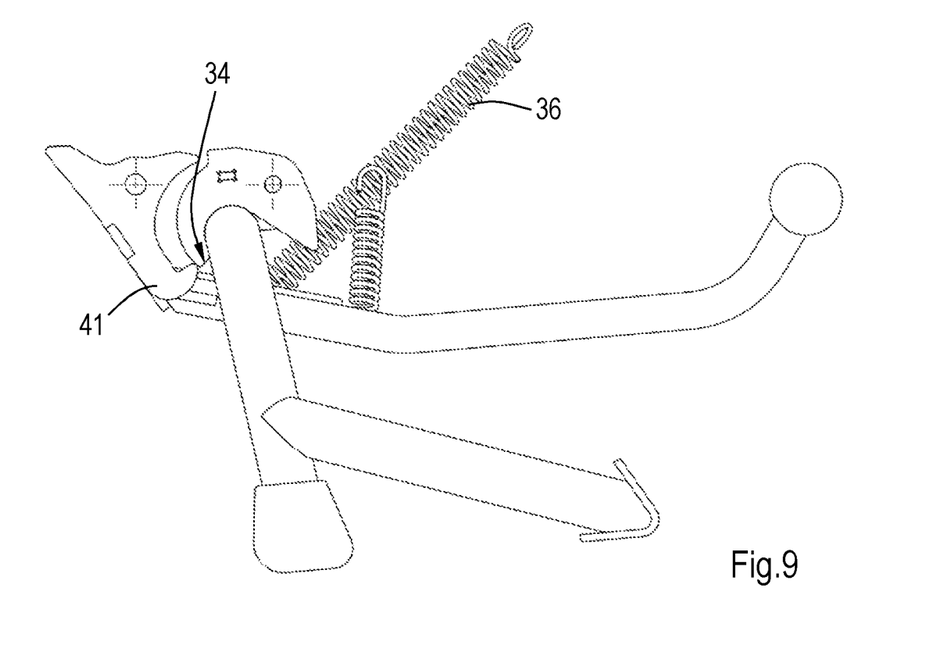
FIG. 9: shows the kickstand of FIG. 2 in side view in a second intermediate position.

To release the kickstand 17, the user can push down the latch pedal 21 by foot to move the hook-shaped lower ends 41 of the latch flanges 40 away from the radial edge 34 of the guiding flange 31 of the stand 19 (see FIG. 9). In this position the stand 19 is not blocked anymore and will be pulled upwardly by the stand biasing spring 36 until it is back in the retracted position of FIG. 7. The user can then release the latch pedal 21, allowing it to be pulled upward by the latch biasing spring 44.

As shown in FIG. 3, a rotary damper 45 has one end connected to one of the guiding flanges 31 of the stand 19 while the other end is connected to a flange 46 fixed to the base 18. After unlatching the kickstand 17, the damper 45 damps movement of the stand 19 when the stand 19 is pulled back by the stand biasing spring 36 into the retracted position.

It is noted that the drawings are schematic, not necessarily to scale, and that details that are not required for understanding the present invention may have been omitted. The terms "front", "rear", "upward", "downward", "below", "above", "horizontal", "vertical" and the like relate to the regular upright position of the bike, with the steerable wheel being the front wheel.

The disclosure is not restricted to the above described embodiments which can be varied in a number of ways within the scope of the claims. For instance, the latching mechanism may be designed to latch the stand in one or more intermediate positions between the standing position and the retracted position.

The invention claimed is:

1. A kickstand comprising:
a base connected or connectable to a bike frame, said bike frame having a front side and a rear side;
a stand movable relative to the base about a rotational stand axis between a standing position and a retracted position; and
a latch latching the stand in the standing position;
wherein the latch is pivotable about a substantially horizontal rotational latch axis between a latching position and a release position;
the latch comprises a pedal;
the rotational stand axis is substantially parallel to the rotational latch axis ($R_L$);
the rotational latch axis is located at a first side of the rotational stand axis, as determined when the bike frame is in an upright position; and
the pedal of the latch extends below the rotational stand axis between the latch axis and a position at a second side of the rotational stand axis, which is opposite to the first side of the rotational stand axis, all as determined when the bike frame is in an upright position.

2. The kickstand according to claim 1, further comprising a latch biasing spring biasing the latch into the latching position.

3. The kickstand according to claim 2, further comprising a stand biasing spring biasing the stand into the retracted position.

4. The kickstand according to claim 2, wherein the stand is symmetrically U-shaped with two legs extending from a middle section of the stand pointing toward the second side of the rotational stand axis when the stand is in the retracted position, and downward when the stand is in the standing position, as determined when the bike frame is in an upright position.

5. The kickstand according to claim 1, further comprising a stand biasing spring biasing the stand into the retracted position.

6. The kickstand according to claim 5, wherein the stand is symmetrically U-shaped with two legs extending from a middle section of the stand pointing toward the second side of the rotational stand axis when the stand is in the retracted position, and downward when the stand is in the standing position, as determined when the bike frame is in an upright position.

7. The kickstand according to claim 1, wherein the stand is symmetrically U-shaped with two legs extending from a middle section of the stand pointing toward the second side of the rotational stand axis when the stand is in the retracted position, and downward when the stand is in the standing position, as determined when the bike frame is in an upright position.

8. The kickstand according to claim 7, wherein the U-shaped stand comprises a cam fixed to the middle section with an edge of the cam engaging the latch inthe latching position.

9. The kickstand according to claim 8, wherein the cam comprises an outline for gradually pushing down the latch during movement of the stand from the retracted position to the standing position until the latch snaps behind the edge of the cam.

10. The kickstand according to claim 9, wherein the cam comprises two symmetrically shaped and arranged guiding flanges fixed to the middle section of the U-shaped stand, and the latch comprises two symmetrically shaped and arranged latch flanges engaging the guiding flanges.

11. The kickstand according to claim 8, wherein the cam comprises two symmetrically shaped and arranged guiding flanges fixed to the middle section of the U-shaped stand, and the latch comprises two symmetrically shaped and arranged latch flanges engaging the guiding flanges.

12. The kickstand according to claim 11, wherein at least one of the legs of the U-shaped stand comprises an arm support extending toward the second side of the rotational stand axis from a lower end of the leg, and the legs and the arm support together define a support face.

13. The kickstand according to claim 11, further comprising an inertia damper damping movement of the stand when the stand is pulled back by the stand biasing spring into the retracted position.

14. The kickstand according to claim 7, wherein at least one of the legs of the U-shaped stand comprises an arm support extending toward the second side of the rotational stand axis from a lower end of the leg, and the legs and the arm support together define a support face.

15. The kickstand according to claim 1, further comprising an inertia damper damping movement of the stand when the stand is pulled back by the stand biasing spring into the retracted position.

16. The kickstand according to claim 15, wherein the inertia damper is a rotary damper.

17. The kickstand according to claim 1, wherein the stand inclines toward the second side of the rotational stand axis in a sideview in the standing position, as determined when the bike frame is upright.

18. The kickstand according to claim 17, wherein the standing position is between the 4 o'clock position and the 6 o'clock position.

19. A bike comprising the kickstand according to claim 1.

20. The bike according to claim 19 wherein the bike is a cargo bike.

\* \* \* \* \*